United States Patent
Torii et al.

(10) Patent No.: US 10,081,569 B2
(45) Date of Patent: Sep. 25, 2018

(54) PROCESS FOR PRODUCING GLASS SUBSTRATE, AND GLASS SUBSTRATE

(71) Applicant: ASAHI GLASS COMPANY, LIMITED, Tokyo (JP)

(72) Inventors: Hideharu Torii, Tokyo (JP); Nobuo Nakajima, Tokyo (JP); Kazutomo Mori, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 15/385,327

(22) Filed: Dec. 20, 2016

(65) Prior Publication Data

US 2017/0174562 A1   Jun. 22, 2017

(30) Foreign Application Priority Data

Dec. 21, 2015   (JP) ................................. 2015-248356

(51) Int. Cl.
| | |
|---|---|
| *C03C 15/00* | (2006.01) |
| *C03C 17/00* | (2006.01) |
| *C03C 19/00* | (2006.01) |
| *G02B 1/11* | (2015.01) |
| *C03B 33/00* | (2006.01) |

(52) U.S. Cl.
CPC .............. *C03C 15/00* (2013.01); *C03B 33/00* (2013.01); *C03C 17/007* (2013.01); *C03C 19/00* (2013.01); *G02B 1/11* (2013.01); *C03C 2217/478* (2013.01)

(58) Field of Classification Search
CPC ....... C03C 15/00; C03C 17/007; C03C 19/00; C03C 2217/478; C03B 33/00; G02B 1/11
See application file for complete search history.

(56) References Cited

U.S. PATENT DOCUMENTS

| | | | |
|---|---|---|---|
| 8,003,194 B2 | 8/2011 | Richter et al. | |
| 8,992,786 B2 | 3/2015 | Kohli et al. | |
| 2011/0267697 A1* | 11/2011 | Kohli | C03C 15/00 359/609 |
| 2011/0267698 A1* | 11/2011 | Guilfoyle | C03C 3/087 359/609 |
| 2012/0134024 A1* | 5/2012 | Lander | C03C 15/00 359/599 |
| 2012/0134025 A1* | 5/2012 | Hart | C03C 15/00 359/601 |
| 2013/0107370 A1* | 5/2013 | Lander | C03C 15/00 359/609 |
| 2013/0323468 A1* | 12/2013 | Myers | C03C 17/007 428/143 |
| 2015/0160376 A1 | 6/2015 | Kohli et al. | |

FOREIGN PATENT DOCUMENTS

| | | |
|---|---|---|
| JP | 2013/529316 A | 7/2013 |
| WO | 2014/119453 A1 | 8/2014 |

\* cited by examiner

*Primary Examiner* — Nathan L Van Sell
(74) *Attorney, Agent, or Firm* — Oblon, McClelland, Maier & Neustadt, L.L.P.

(57) ABSTRACT

A process for producing a glass substrate includes a step of forming an antiglare region on at least one of main surfaces of a glass plate, a cutting step of cutting the glass plate and a removal step of removing a part of the antiglare region.

7 Claims, 11 Drawing Sheets
(1 of 11 Drawing Sheet(s) Filed in Color)

PROCESS FOR PRODUCING GLASS SUBSTRATE, AND GLASS SUBSTRATE

CROSS-REFERENCE TO RELATED APPLICATIONS

This application claims priority from Japanese Patent Application No. 2015-248356 filed on Dec. 21, 2015, the entire subject matter of which is incorporated herein by reference.

BACKGROUND OF THE INVENTION

Technical Field

The present invention relates to a process for producing a glass substrate and to the glass substrate. In particular, the present invention relates to a process for producing a glass substrate to which an antiglare function has been imparted and to the glass substrate.

Background Art

In recent years, a cover including a transparent substrate is disposed on the display-side surface of a display device such as, for example, an LCD (liquid-crystal display) device in order to protect the display device. From the standpoint of appearance, glass substrates are frequently used as the transparent substrate. However, in cases where such a glass substrate has been disposed on a display device and images displayed on the display device are viewed through the glass substrate, there are often cases where objects placed around the display device are reflected in a glass substrate surface. In cases where such reflection in the glass substrate surface occurs, not only it is difficult for a viewer to recognize displayed images but also the viewer has an unpleasant feeling.

It is hence attempted to inhibit such reflection, for example, by performing an antiglare treatment in which a concave-convex shape is formed on a surface of a glass substrate.

Examples of methods for the antiglare treatment include etching a surface of a glass substrate (see, for example, Patent Document 1) and forming a film having a concave-convex shape on a surface of a glass substrate (see, for example, Patent Document 2). In each of these methods, however, it is desirable from the standpoint of improving production efficiency that after the antiglare treatment for imparting a concave-convex shape to a large glass substrate is performed, this glass substrate should be subjected to cutting and processing in accordance with the shapes of individual products.

Once an antiglare treatment has been carried out, it is extremely difficult to precisely remove a part of the region which has undergone the antiglare treatment. A technique has hence been proposed in which a region that is desired not to be subjected to an antiglare treatment (hereinafter referred to as "non-antiglare region") is masked beforehand to separately form the non-antiglare region and an antiglare region (see, for example, Patent Document 3).

However, in the case of forming a non-antiglare region by masking, it is impossible to change the positions of the antiglare region and non-antiglare region after an antiglare treatment has been performed. There has hence been a problem in that in case where the positions of the regions have shifted, this results in waste.

Patent Document 1: International Publication WO 2014/119453

Patent Document 2: U.S. Pat. No. 8,003,194

Patent Document 3: JP-T-2013-529316 (The term "JP-T" as used herein means a published Japanese translation of a PCT patent application.)

BRIEF SUMMARY OF THE INVENTION

An object of an aspect of the present invention is to provide a process for highly efficiently producing a glass substrate to which an antiglare function has been imparted, and to provide the glass substrate.

The process of an aspect of the present invention for producing a glass substrate includes a step of forming an antiglare region on at least one of main surfaces of a glass plate, a cutting step of cutting the glass plate, and a removal step of removing a part of the antiglare region.

The glass substrate of an aspect of the present invention includes a glass plate, an antiglare region formed on at least one of main surfaces of the glass plate, and a non-antiglare region formed on the same main surface as the antiglare region, wherein the non-antiglare region is a non-smooth region formed by removing a part of the antiglare region on the main surface of the glass plate and which has a maximum height difference within the surface of 0.6 μm or less.

According to embodiments of the present invention, it is possible to provide a process for highly efficiently producing a glass substrate to which an antiglare function has been imparted and to provide the glass substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Embodiments of the present invention are explained below in more detail by reference to the drawings.

(First Embodiment)

Figure 1:
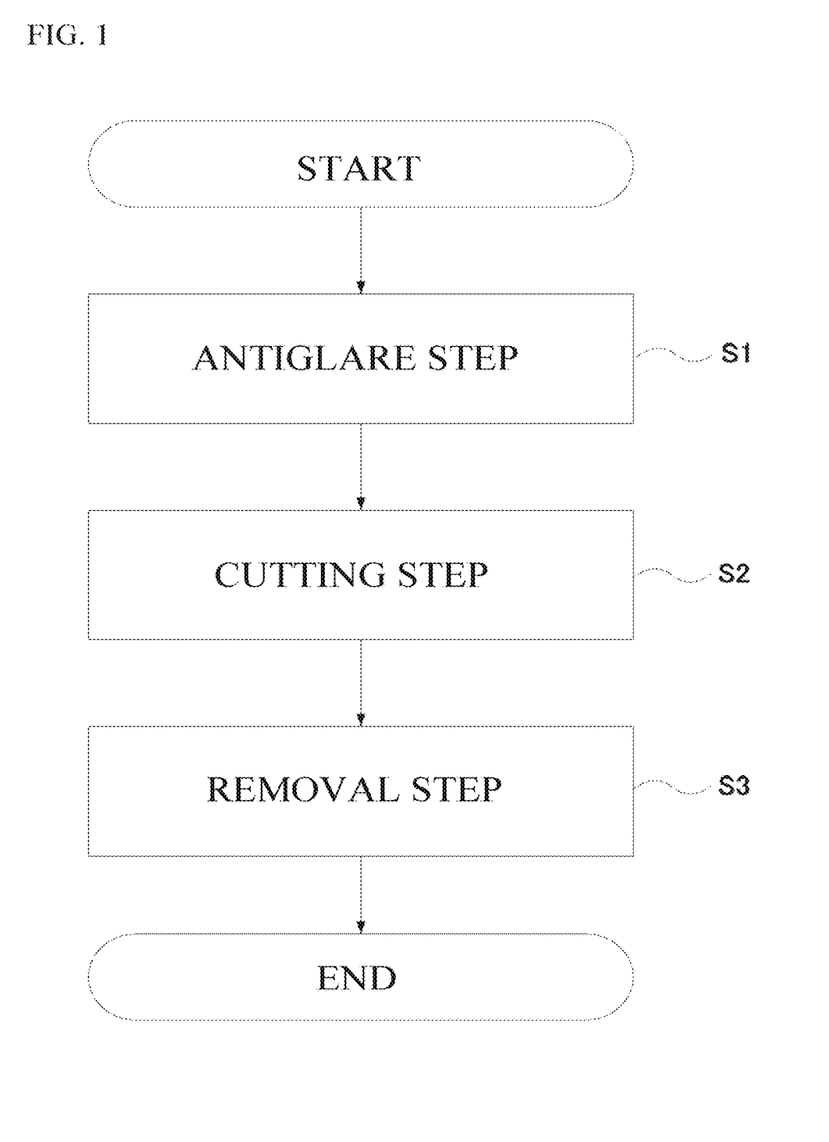
FIG. 1 is a flowchart which schematically shows a process for glass substrate production according to a first embodiment of the present invention.

FIG. 1 is a flowchart which schematically shows a process for glass substrate production according to a first embodiment of the present invention. The process for glass substrate production according to a first embodiment of the present invention is explained briefly by reference to FIG. 1.

As shown in FIG. 1, the process for producing glass substrate according to the first embodiment of the present invention includes: a step S1 of forming an antiglare region on at least one of main surfaces of a glass plate (antiglare step); a step S2 of cutting the glass plate (cutting step); and a step S3 of removing a part of the antiglare region(removal step).

S1 is a step of forming an antiglare region on at least one of the main surfaces. Methods for the processing are not particularly limited, and use can be made of a method in which a main surface of the glass plate is subjected to a surface treatment to form desired concaves and convexes. In the glass substrate in this embodiment, the antiglare region is a region where a transmitted-light haze in a visible-light region is, for example, 0.5 to 70%, while the non-antiglare region is a region in the glass surface in which such concaves and convexes have not been formed and which has a transmitted-light haze in a visible-light region of, for example, less than 0.5%.

Specifically, examples of the method include a method in which a frosting treatment is given to the main surface of the glass plate. The frosting treatment can be conducted, for example, by immersing the glass plate, as an object to be treated, in a mixed solution of hydrogen fluoride and ammonium fluoride to chemically treat the surface immersed therein.

Usable besides methods based on such a chemical treatment are methods based on physical treatments such as, for example, a so-called sand blasting in which a crystalline silicon dioxide powder, silicon carbide powder, or the like is blown against the surface of the glass plate by compressed air or grinding with a brush equipped with bristles which have a crystalline silicon dioxide powder, silicon carbide powder, or the like adhered thereto and which have been moistened with water.

Especially in the method in which a frosting treatment is given to chemically treat the glass plate surface with a liquid chemical such as, for example, hydrogen fluoride, microcracks are less apt to be formed in the surface of the object being treated and a decrease in mechanical strength is less apt to occur. This method can hence be advantageously used as a method for treating surfaces of a transparent substrate.

After concaves and convexes are thus formed, chemically etching the glass surface in order to arrange the surface shape is generally conducted. By this etching, the haze can be regulated to a desired value in accordance with the etching amount and the cracks formed by the sand blasting or the like can be eliminated. Furthermore, glittering can be reduced.

A preferred method for the etching is to immerse the glass plate, as an object to be treated, in a solution which includes hydrogen fluoride as a main component. This solution may contain hydrochloric acid, nitric acid, citric acid, and the like as components other than hydrogen fluoride. Due to the inclusion of these components, alkali components contained in the glass can be inhibited from reacting with the hydrogen fluoride and thereby locally causing a precipitation reaction, and the etching can hence be allowed to proceed evenly throughout the surface.

An antiglare region may be formed by disposing an antiglare film on a main surface of the glass plate. The refractive index of the antiglare film can be regulated by selecting a material of a matrix of the antiglare film, regulating the porosity of the antiglare film, adding a substance having any desired refractive index into the matrix, etc. For example, by heightening the porosity of the antiglare film, the refractive index thereof can be reduced. Furthermore, by adding a substance having a low refractive index (e.g., solid silica particles or hollow silica particles) into the matrix, the refractive index of the antiglare film can be reduced.

It is preferable that the antiglare film should include silica as a main component, but the antiglare film is not limited thereto. In cases where the antiglare film includes silica as a main component, this antiglare film is apt to have a low refractive index (reflectance). In addition, this antiglare film is satisfactory also in terms of chemical stability, etc., and has satisfactory adhesion to the glass plate. In this specification, the expression "including silica as a main component" means that the film includes $SiO_2$ in an amount of 50% by mass or larger. More preferably, the film includes $SiO_2$ in an amount of 90% by mass or larger.

In the case where silica is included as a main component, this antiglare film may comprise silica only or may contain a small amount of one or more components other than silica. Examples of such components include one or more kinds of ions selected from among Li, B, C, N, F, Na, Mg, Al, P, S, K, Ca, Ti, V, Cr, Mn, Fe, Co, Ni, Cu, Zn, Ga, Sr, Y, Zr, Nb, Ru, Pd, Ag, In, Sn, Hf, Ta, W, Pt, Au, Bi, and lanthanide elements and/or compounds, e.g., oxides, of these.

Examples of the antiglare film include ones formed from a coating composition including a silica precursor and/or silica particles and further including a liquid medium. This coating composition may contain a binder other than a silica precursor, other additives, etc., according to need. In the case where the coating composition contains a silica precursor, a mixture matrix of the antiglare film is one in which silica derived from the silica precursor is included as a main component. The antiglare film may comprise particles and, in this case, the particles preferably are silica particles. In addition, the antiglare film may be one configured of the matrix and particles dispersed therein. In this specification, the term "antiglare film" is used for reasons of convenience. Actually, however, the antiglare film need not be a film continuously formed over the whole of a glass plate surface. That term is used herein for meaning not a glass plate surface which has been directly modified by etching but a layer which has been newly formed on a glass plate surface and performs an antiglare function.

As described above, examples of the antiglare film including silica as a main component include ones formed from a coating composition containing a silica precursor and ones formed from a coating composition containing silica particles. Examples of the antiglare film further include ones comprising, for example, a resin film in which silica is not a main component.

S2 is a step of cutting the glass plate (cutting step). As a method for the cutting, use can be made of a method in which scribing lines are drawn on a surface of the large glass plate with, for example, a cutter wheel, thereby snapping the large glass plate or a method in which the glass plate is cut by irradiation with laser light. The cut pieces of the glass plate may be subjected to a chamfering step in which end surfaces are chamfered.

In S2, the large glass plate can be cut into glass plates of a size according to the intended use thereof. In this step, the large glass plate need not be separated into glass plates, all of which have the same size, and can be separated into multiple glass plates which suitably have respective sizes. In case where non-antiglare regions are formed by masking in specific positions, the glass plate must be separated in accordance with the positions of the non-antiglare regions. In this embodiment, however, a non-antiglare region is not formed beforehand and, hence, the large glass plate can be efficiently cut into a maximum number of pieces.

S3 is a step of removing a part of the antiglare region (removal step), that is, a step in which a part of the surface which has temporarily become an antiglare region is deprived of the antiglare function and is thereby converted to a non-antiglare region. In the case where the glass substrate according to this embodiment is to be used as a cover glass of a portable electronic appliance, for example, the non-antiglare region is disposed on a region in front of a camera or on a region where a fingerprint sensor is to be disposed. In the case where the glass substrate is to be used as a protective member for other sensors, the non-antiglare region is disposed on a region where visible light and/or radio waves for sensing pass through.

Examples of specific means for removing a part of the antiglare region include a method of grinding a part of the antiglare region. In the case where concaves and convexes have been formed on the surface of the glass plate itself, the removal by grinding can be accomplished by removing a part of the portion where the concaves and convexes have been formed. In the case where a film has been formed on the glass plate surface, the removal by grinding can be accomplished by removing a part of the film. Meanwhile, it may also be possible to remove a part of the antiglare region by using laser light or an etchant. In the case of using laser light, the removal can be accomplished by directly modifying the glass plate surface with the laser light or by vaporizing, with the laser light, the film formed on the glass plate surface. In the case of using an etchant, use can be suitably made of an etchant with which the glass plate surface can be directly etched, such as hydrofluoric acid, or an etchant which is capable of etching the film formed on the glass plate surface.

In the case of removing a part of the antiglare region with an etchant, use may be made of a method in which the etchant is selectively supplied to the region which is desired to be removed or a method in which the region which is desired not to be converted to a non-antiglare region is masked. However, the method using grinding, laser light, or the like is preferred since high-precision processing is easy.

Removal by grinding is described below in detail as one example of the removal step S3.

Figure 2:
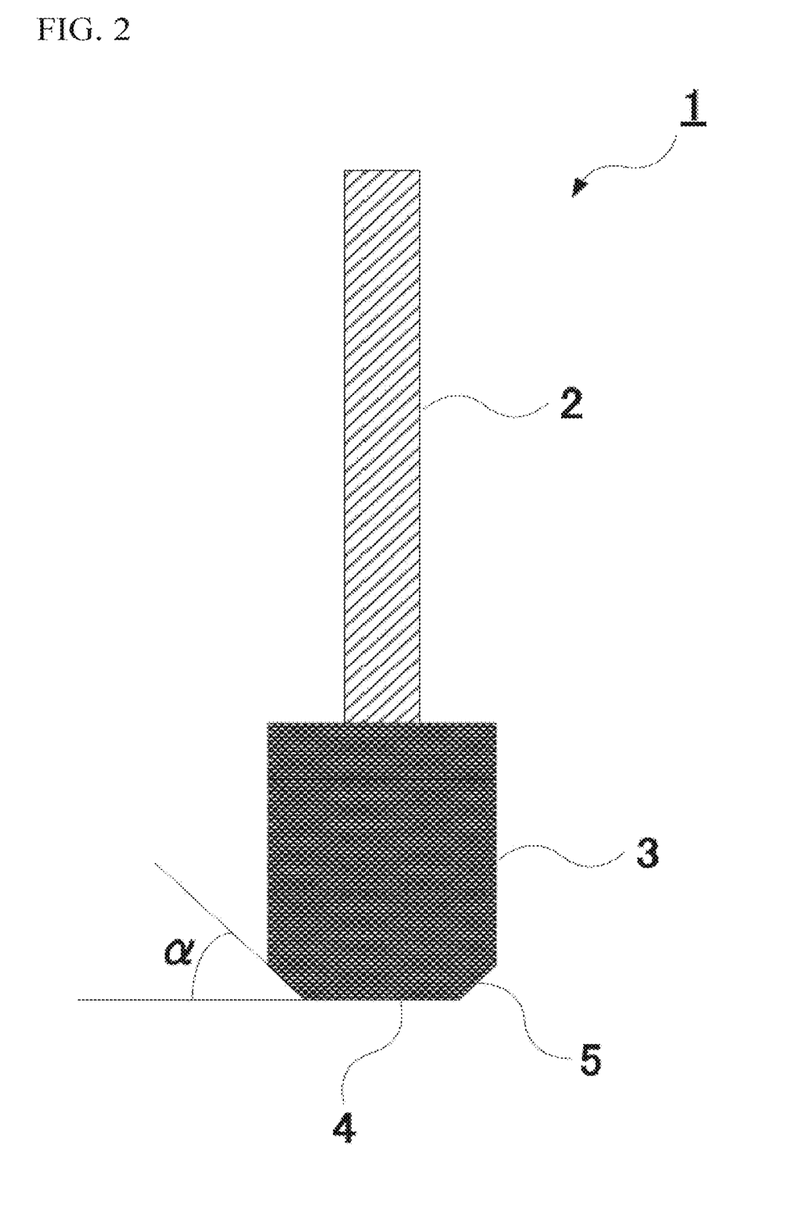
FIG. 2 is a cross-sectional view which illustrates one example of grindstones usable in the removal step of the first embodiment of the present invention.

FIG. 2 is a cross-sectional view which illustrates one example of grindstones usable in the removal step in the first embodiment of the present invention. This grindstone 1 is configured of a supporting part 2 and a grindstone part 3. The supporting part 2 includes a member made of, for example, stainless steel, and the grindstone part 3 usually includes abrasive grains and a bond which fixes the abrasive grains. The supporting part 2 and the grindstone part 3 each generally have a cylindrical shape, but the shapes thereof are not limited to a cylindrical shape. However, since the grinding is conducted while rotating the grindstone 1, it is preferable, from the standpoint of evenness, that the supporting part 2 and the grindstone part 3 should be cylindrical.

With respect to a kind of abrasive grains usable in the grindstone part 3, use can be made, for example, of materials having a Knoop hardness (HK) of 4,000 or less, such as cerium oxide, green carbonate, and aluminum oxide. The abrasive grains are not particularly limited in grain size. However, in the case of using abrasive grains other than cerium oxide, it is preferable that the grain size thereof should be #3,000 or finer (for example, an average grain diameter of about 4 to 8 μm or smaller), from the standpoint of a property of scratching the glass plate. A kind of bond usable in the grindstone part 3 is not particularly limited, and use can be made, for example, of a vitrified bond, metal bond, resin bond, or electrodeposition grindstone formed by bonding abrasive grains together.

In the case where the grindstone part 3 has a cylindrical shape, a diameter thereof can be suitably regulated in accordance with a size of the non-antiglare region. In general, however, the diameter thereof is about 0.5 to 100 mm. A chamfer 5 has been disposed at an outer periphery of the end surface 4, which comes into contact with the glass surface and serves as a grinding surface. Usually, the chamfer 5 has been disposed over the whole outer periphery of end surface of the grindstone part 3. The angle a which the chamfer 5 forms with the lower end surface 4 is 20 to 60°. The disposition of the chamfer 5 makes it possible to evenly apply force to the surface to be ground, when the lower end surface 4 is pushed against the glass plate, and to finish the glass plate surface so that a non-antiglare region reduced in height difference therein is obtained.

In the case where the antiglare region is one produced by forming concaves and convexes on the surface of the glass plate itself, use of abrasive grains having a Knoop hardness (HK) of 2,000 to 4,000 is preferred. In the case where the antiglare region is one comprising an antiglare film, use of abrasive grains having a Knoop hardness (HK) of 2,000 or less is preferred. This is because use of such abrasive grains makes it possible to finish the glass surface so as to form a non-antiglare region reduced in height difference.

The rotation speed of the grindstone 1 in the removal step S3 is not particularly limited. However, the rotation speed thereof is generally 20 to 60,000 rpm. In the case where the antiglare region is one produced by forming concaves and convexes on the surface of the glass plate itself, the rotation speed is preferably 30,000 rpm or higher. It is more preferred to conduct the removal at a rotation speed of 40,000 or higher. Higher rotation speeds are more effective in diminishing height differences within the non-antiglare region. Meanwhile, in the case where the antiglare region is one comprising an antiglare film, lower rotation speeds of 5,000 rpm or below are more effective in finishing the glass surface to form a non-antiglare region further reduced in height difference. It is preferred to conduct the removal at a rotation speed of preferably 1,000 rpm or lower, in particular, 200 rpm or lower. Lower rotation speeds are more effective in diminishing height differences within the non-antiglare region.

Figure 3:
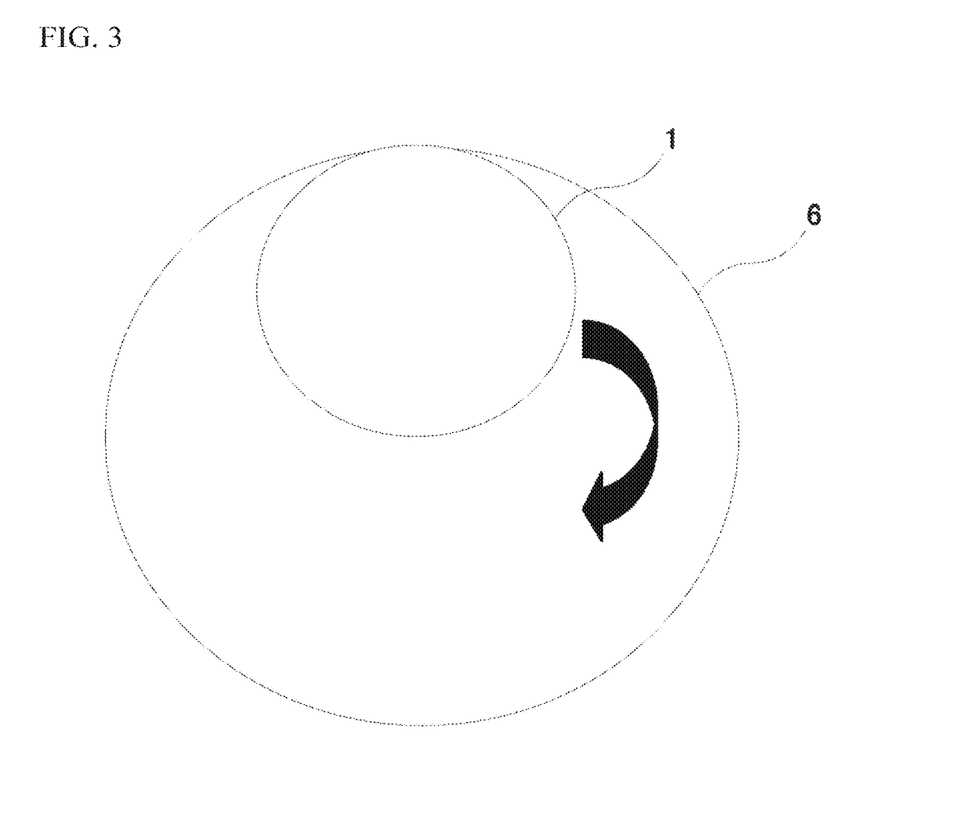
FIG. 3 is a top view which illustrates one example of trajectories of a grindstone 1 in the removal step S3.

With respect to the trajectory of the grindstone 1 in the removal step S3, the grindstone 1 can be moved, for example, as shown in FIG. 3 so that a resultant non-antiglare region 6 has a circular shape. That is, the grindstone 1 can be moved along a circumferential direction, which is the direction indicated by the arrow in FIG. 3. Although the trajectory of the grindstone 1 is not particularly limited, it is preferred to regulate the trajectory so that a time period during which the glass surface is in contact with the grindstone is as even as possible throughout the non-antiglare region 6. A traveling speed of the grindstone 1 is not particularly limited, and can be suitably changed.

Figure 4:
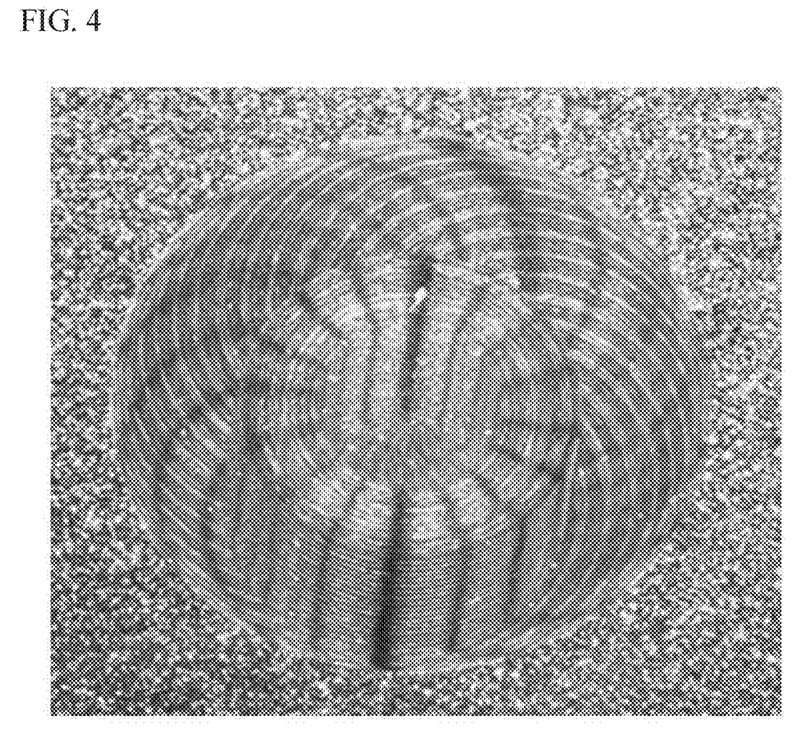
FIG. 4 is a top view, obtained with a microscope, which shows one example of non-antiglare regions formed when a grindstone was moved along a circumferential direction.

In the removal step S3, the grindstone 1 need not be moved along one trajectory, and may be moved along a plurality of trajectories in combination. FIG. 4 is a top view, obtained with a microscope, which shows one example of non-antiglare regions formed when the grindstone was moved along a circumferential direction. As shown in FIG. 4, since the grindstone has a cylindrical shape, there are cases where the portions which come into contact with a center part of the lower end surface serving as a grinding surface and the portions which come into contact with an outer peripheral part of the lower end surface differ from each other in the amount removed by grinding. For finishing the non-antiglare region so that the region is free from light-transmission unevenness and from transmitted-light scattering fluctuations and has a satisfactory appearance, it is necessary that the non-antiglare region should have a maximum height difference therein of 0.6 μm or less. More preferably, the maximum height difference is 0.4 μm or less.

Figure 5:
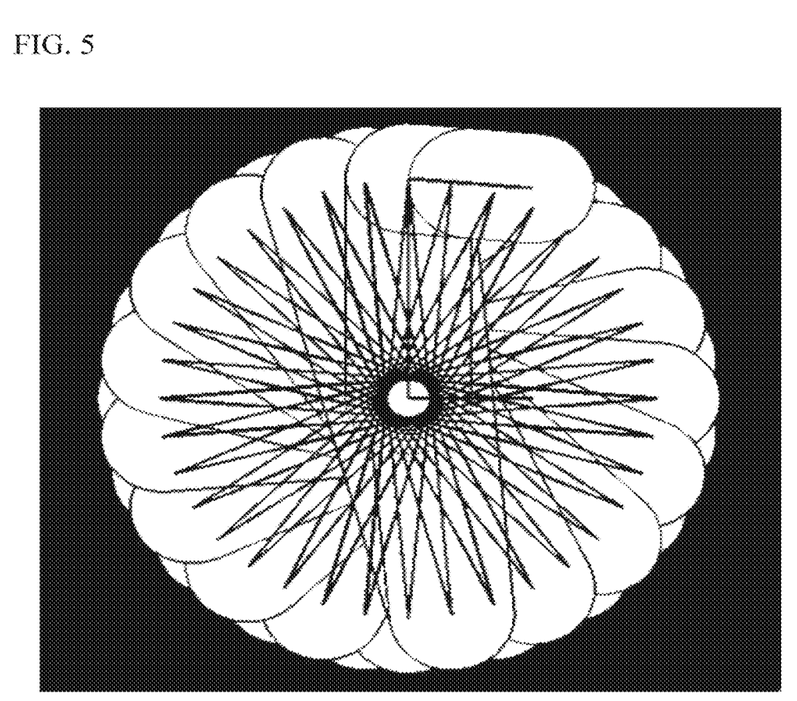
FIG. 5 is a top view which illustrates one example of trajectories of a grindstone in a finish grinding step in the first embodiment of the present invention.
Figure 6:
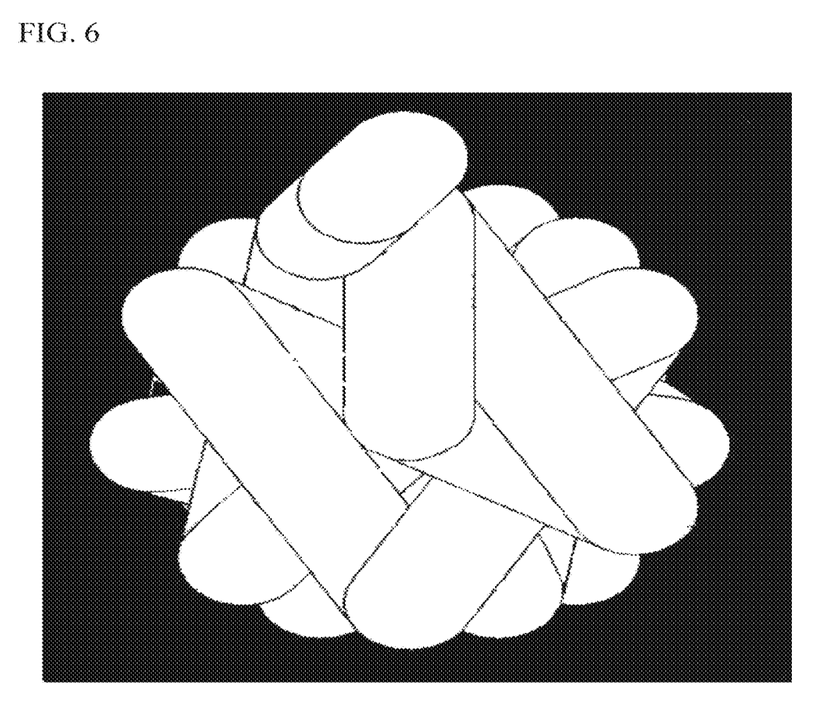
FIG. 6 is a top view which illustrates another example of trajectories of the grindstone in the finish grinding step in the first embodiment of the present invention.

It is therefore preferable that different grindstone trajectories should be used in combination so that there is no difference in processing convergence between the center part and outer peripheral part of the grinding surface of the grindstone. For example, possible combinations of trajectories include: such trajectories that a grindstone is moved in a radial direction so that the center of the grindstone always passes through the center of the circle of the non-antiglare region and that the direction is changed little by little, as shown in FIG. 5; and such trajectories that a grindstone is moved along the shape of N so that the center of a shape of N comes to coincide with the center of the circle and the grinding is conducted while changing the angle thereof little by little, as shown in FIG. 6.

A preferred example may be a combination of a main grinding step in which a grindstone is moved along a circumferential direction and a finish grinding step in which the grindstone is moved along such a trajectory that the center of the grindstone comes to coincide with the center of the circle multiple times to thereby eliminate the circumferential-direction difference in processing convergence which has resulted from the main grinding step.

Examples of the glass plate include soda-lime glass, borosilicate glass, aluminosilicate glass, and alkali-free glasses. The glass plate is one formed by the float process, downdraw process, etc. Furthermore, the glass plate may be not only a glass plate having a flat shape but also a glass plate having a curved surface. The thickness of the glass plate is not particularly limited, and a glass plate having a thickness of 10 mm or less can be used. Such a thickness is preferred for applications where an improvement in transmittance is desired, because the smaller the thickness, the more a light absorption is reduced.

It is preferable that the glass plate should be a strengthened glass plate. The strengthened glass plate is a glass plate which has undergone a strengthening treatment. The strengthening treatment improves the strength of the glass, and makes it possible to, for example, reduce a plate thickness while maintaining the strength. Generally known as the strengthening treatment is a treatment in which a compressive stress layer is formed in a glass plate surface. Representative means for forming a compressive stress layer in a glass plate surface are an air-chilling strengthening method (physical strengthening method) and a chemical strengthening method.

The glass plate to which a chemical strengthening treatment is given is not particularly limited so long as the glass plate has a composition which renders chemical strengthening possible, and glasses of various compositions can be used. Examples thereof include soda-lime glass, aluminosilicate glass, borate glass, lithium aluminosilicate glass, borosilicate glass, and other various glasses. From the standpoint of ease of chemical strengthening, a preferred glass composition includes, as represented by mole percentage based on oxides, from 56 to 75% of $SiO_2$, from 1 to 20% of $Al_2O_3$, from 8 to 22% of $Na_2O$, from 0 to 10% of $K_2O$, from 0 to 14% of MgO, from 0 to 5% of $ZrO_2$, and from 0 to 10% of CaO. Preferred of those is aluminosilicate glass.

The thickness of the glass plate to be subjected to a chemical strengthening treatment is preferably 0.1 to 3.0 mm, especially preferably 0.5 to 1.5 mm. The physical strengthening treatment and/or chemical strengthening treatment of the glass may be conducted either before or after an antiglare region is formed on a main surface of the glass plate.

The glass substrate produced by the process for glass substrate production according to the present embodiment includes a glass plate, an antiglare region formed on at least one of main surfaces of the glass plate, and a non-antiglare region formed on the same main surface as the antiglare region, wherein the non-antiglare region is a non-smooth surface formed by removing a part of the antiglare region on the main surface of the glass plate and which has a maximum height difference within the surface of 0.6 μm or less. The non-antiglare region is a non-smooth surface which temporarily underwent an antiglare treatment and from which a part of the antiglare region was thereafter removed by a means such as grinding, irradiation with laser light, or contact with an etchant. The term "non-smooth surface" used in the present description means a surface which is not a fire-ground surface formed during a glass plate formation. This is because the glass plate surface underwent some erosion when the antiglare region was removed.

In case where the non-antiglare region is a fire-ground surface and an antiglare region has been disposed therearound so as to adjoin the non-antiglare region, there is a possibility that interference fringes due to a difference in contrast might occur at the boundary therebetween. However, the glass substrate according to this embodiment has a feature wherein since the non-antiglare region is not a fire-ground surface but a non-smooth surface, the contrast difference at the boundary between the non-antiglare region and the adjoining antiglare region is reduced, and further has a feature wherein the maximum height difference within the surface is 0.6 μm or less. Due to these features, light-transmission unevenness and transmitted-light scattering are diminished, and satisfactory appearance quality can be obtained.

(Second Embodiment)

Figure 7:
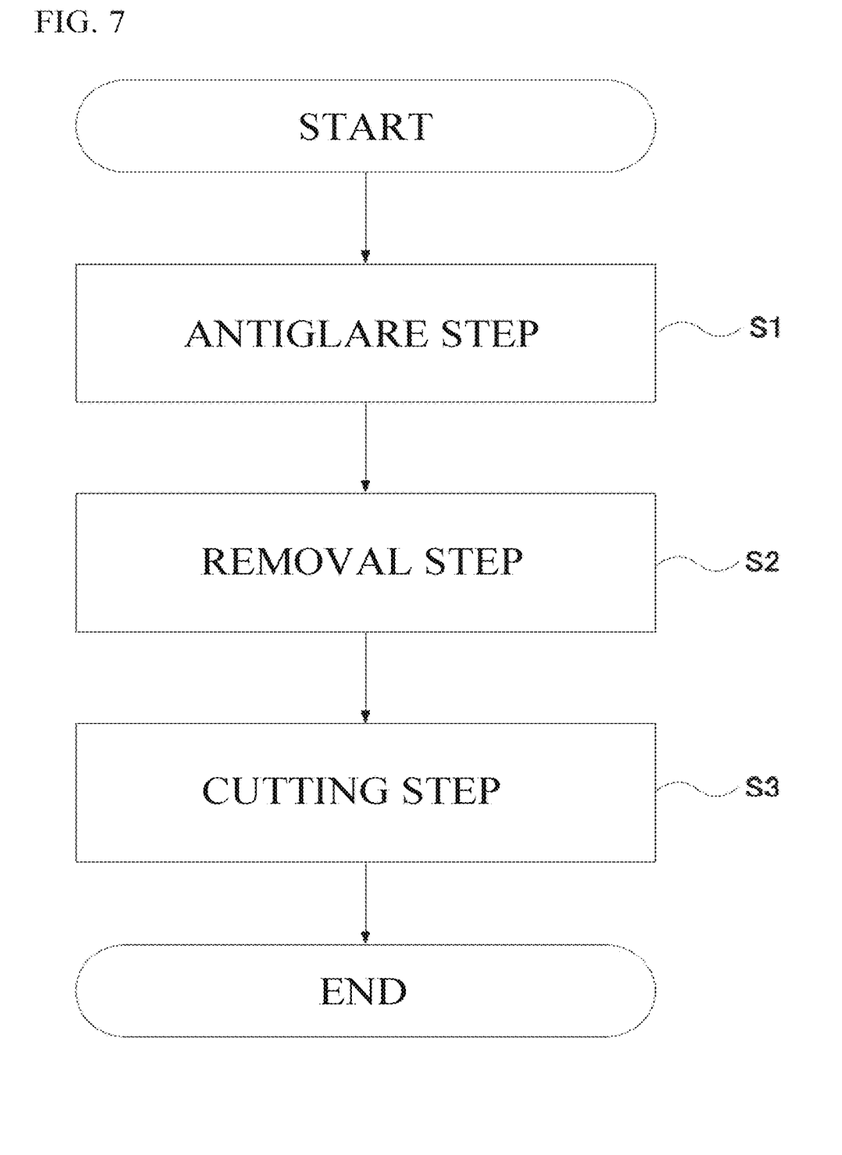
FIG. 7 is a flowchart which schematically shows a process for glass substrate production according to a second embodiment of the present invention.

FIG. 7 is a flowchart which schematically shows a process for glass substrate production according to a second embodiment of the present invention. The process for glass substrate production according to a second embodiment of the present invention is explained briefly by reference to FIG. 7.

As shown in FIG. 7, the process for glass substrate production according to the second embodiment of the present invention includes: a step S1 of forming an antiglare region on at least one of main surfaces of a glass plate (antiglare step); a step S2 of removing a part of the antiglare region (removal step); and a step S3 of cutting the glass plate (cutting step).

The second embodiment differs from the first embodiment in that the removal step is conducted before the cutting step. The second embodiment is equal to the first embodiment in the other respects, and detailed explanations thereon are hence omitted. As apparent from the first embodiment and the second embodiment, either the cutting step or the removal step may be conducted first, and these two steps can be suitably replaced with each other.

EXAMPLES

Examples of the present invention are shown below. Examples 1 to 3 and 15 are examples of the present invention, and Examples 4 to 14 are comparative examples. In each of Examples 1 to 12 was used a glass plate in which a silica-based antiglare film including silica as a main component had been disposed on a main surface of the glass plate. In each of Examples 13 to 15 was used a glass plate in which concaves and convexes had been formed in a surface of the glass plate itself by a frosting treatment. The abrasive grains used were: a white aluminous abrasive material (WA) in Examples 1 to 4, 8 to 10, 13, and 14; diamond in Examples 5 and 12; cerium oxide in Example 6; and green silicon carbide (GC) in Examples 7, 11, and 15.

The bonds used for the abrasive grains were a metal bond in Examples 5 and 12 and resin bonds in the other Examples. However, the resin bond used in Example 1 only was one having a lower elastic modulus than in the other Examples. The traveling speed of the grindstones was 2,500 mm/min in all the Examples, and the processing time was 150 seconds. In each Example, the amount removed from the surface was about 1 μm. In Examples 1 to 4 and 10 to 15, a finish grinding step was also performed. In this finish grinding step, use was made of such trajectories that the grindstone was moved in a radial direction so that the center of the grindstone always passed through the center of the circle of the non-antiglare region and that the direction was changed little by little.

In each of Examples 1 to 15, use was made of a grindstone which had a chamfer formed at the outer periphery of the lower end surface, serving as a grinding surface, and in which the chamfer made an angle of 45° with the lower end surface of the grinding surface. Grindstones having no such chamfer were also used to conduct the same experiments, but a satisfactory non-antiglare region free from light-transmission unevenness and from transmitted-light scattering fluctuations was unable to be obtained by the finishing even when conditions were variously changed. The Examples in each of which the surface was able to be finished as a result of the removal step to give a satisfactory non-antiglare region free from light-transmission unevenness and from transmitted-light scattering fluctuations were each indicated by ○ in the item "Results".

All the results are shown in Table 1 below. It was understood from the results of Examples 1 to 12 that in the case where the antiglare region is one formed by disposing a silica-based antiglare film including silica as a main component on a main surface of the glass plate, satisfactory results tend to be obtained when the rotation speed of the grindstone is low and the bond is soft. Meanwhile, from the results of Examples 13 to 15, it was understood that in the case where the antiglare region is one produced by forming concaves and convexes in a surface of the glass plate itself by a frosting treatment, it is preferred to use abrasive grains having a higher Knoop hardness than in the case of removing the antiglare film and satisfactory results tend to be obtained when the rotation speed of the grindstone is high.

TABLE 1

|  | Antiglare region | Abrasive grains | | | | Finish | | Results |
|---|---|---|---|---|---|---|---|---|
|  |  | Kind | Grain size | Bond | Rotation speed | grinding step | |
| Example 1 | silica-based antiglare film | white aluminous abrasive material | #4000 | resin (soft) | 100 rpm | performed | ○ |
| Example 2 | silica-based antiglare film | white aluminous abrasive material | #4000 | resin | 100 rpm | performed | ○ |
| Example 3 | silica-based antiglare film | white aluminous abrasive material | #4000 | resin | 1000 rpm | performed | ○ |
| Example 4 | silica-based antiglare film | white aluminous abrasive material | #4000 | resin | 5000 rpm | performed | X |
| Example 5 | silica-based antiglare film | diamond | #6000 | metal | 40000 rpm | not performed | X |
| Example 6 | silica-based antiglare film | cerium oxide | #2000 | resin | 40000 rpm | not performed | X |
| Example 7 | silica-based antiglare film | green silicon carbide | #4000 | resin | 40000 rpm | not performed | X |
| Example 8 | silica-based antiglare film | white aluminous abrasive material | #4000 | resin | 40000 rpm | not performed | X |
| Example 9 | silica-based antiglare film | white aluminous abrasive material | #6000 | resin | 40000 rpm | not performed | X |
| Example 10 | silica-based antiglare film | white aluminous abrasive material | #4000 | resin | 40000 rpm | performed | X |
| Example 11 | silica-based antiglare film | green silicon carbide | #4000 | resin | 1000 rpm | performed | X |
| Example 12 | silica-based antiglare film | diamond | #6000 | metal | 1000 rpm | performed | X |
| Example 13 | surface concaves and convexes of glass plate itself | white aluminous abrasive material | #4000 | resin | 1000 rpm | performed | X |
| Example 14 | surface concaves and convexes of glass plate itself | white aluminous abrasive material | #4000 | resin | 40000 rpm | performed | X |
| Example 15 | surface concaves and convexes of glass plate itself | green silicon carbide | #4000 | resin | 40000 rpm | performed | ○ |

Figure 8:
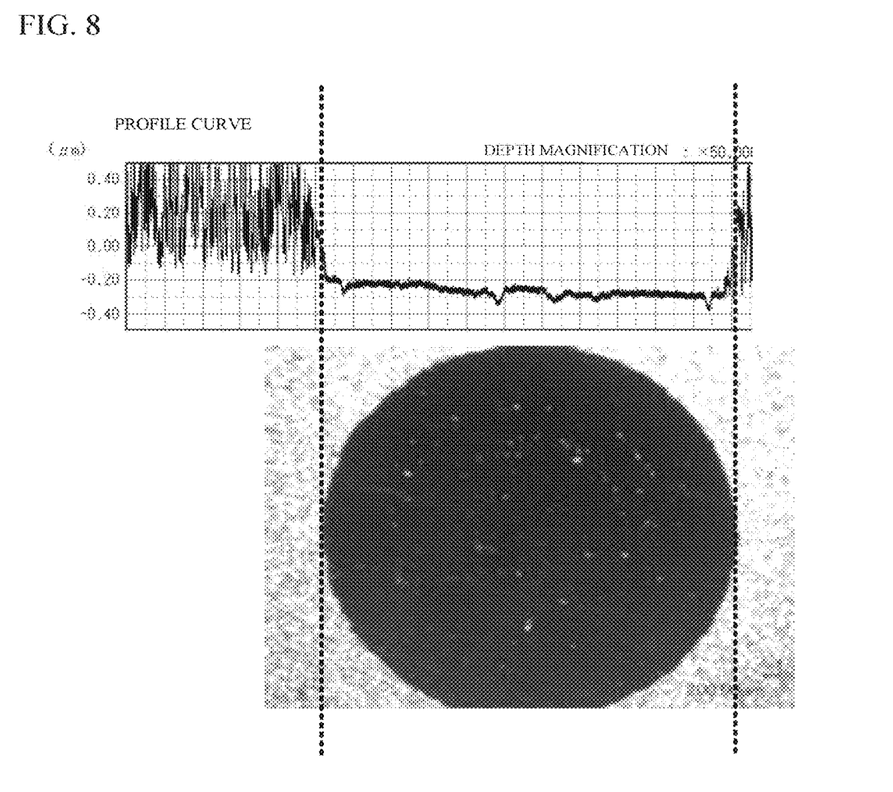
FIG. 8 is a height profile of the non-antiglare region of Example 1 and a top view thereof obtained through an examination with a microscope.
Figure 9:
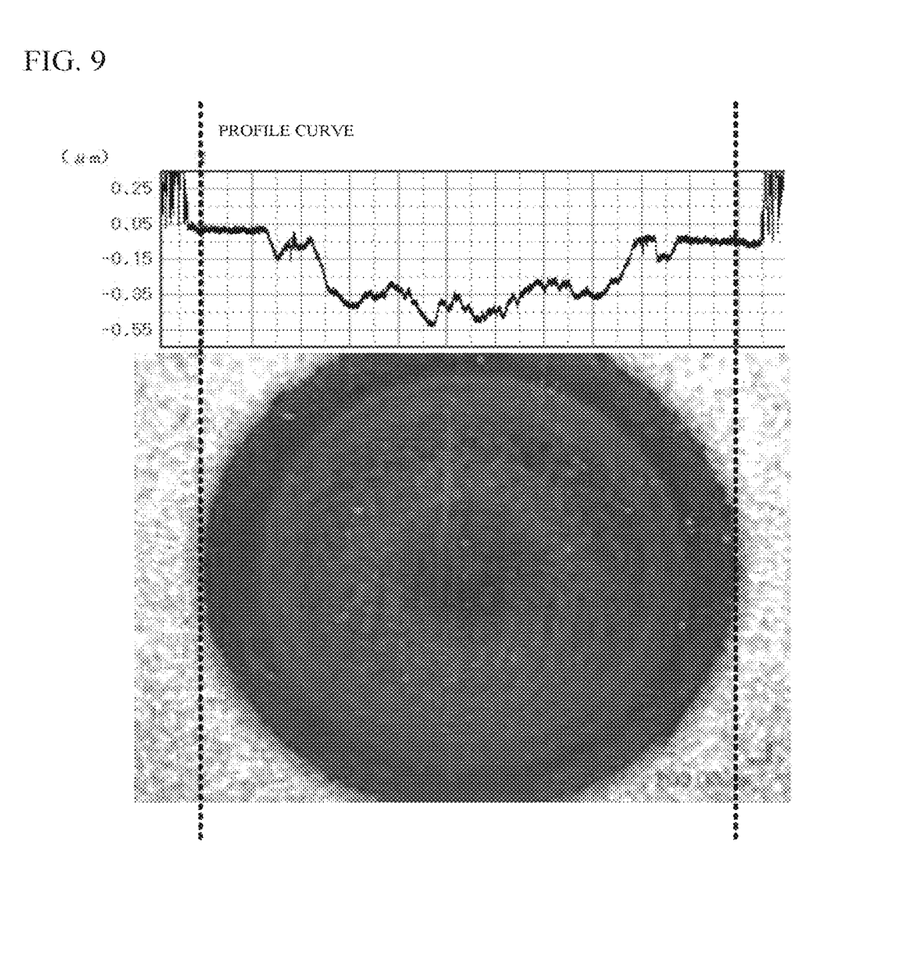
FIG. 9 is a height profile of the non-antiglare region of Example 2 and a top view thereof obtained through an examination with a microscope.
Figure 10:
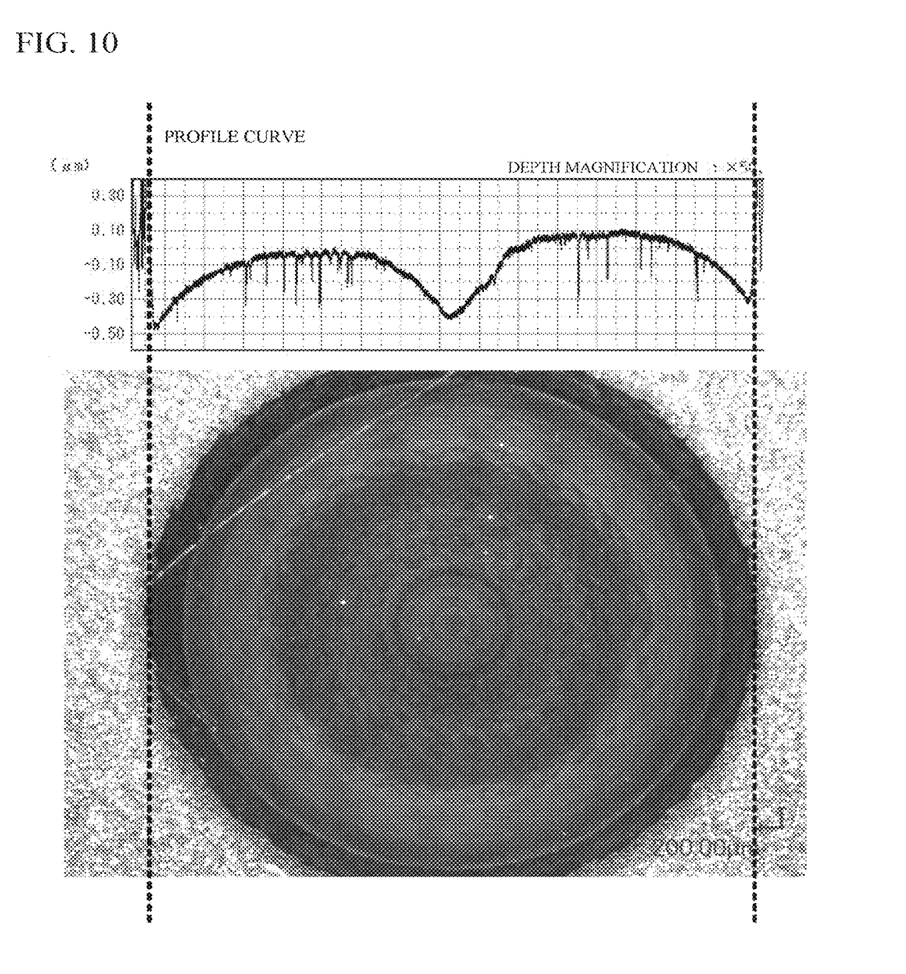
FIG. 10 is a height profile of the non-antiglare region of Example 3 and a top view thereof obtained through an examination with a microscope.
Figure 11:
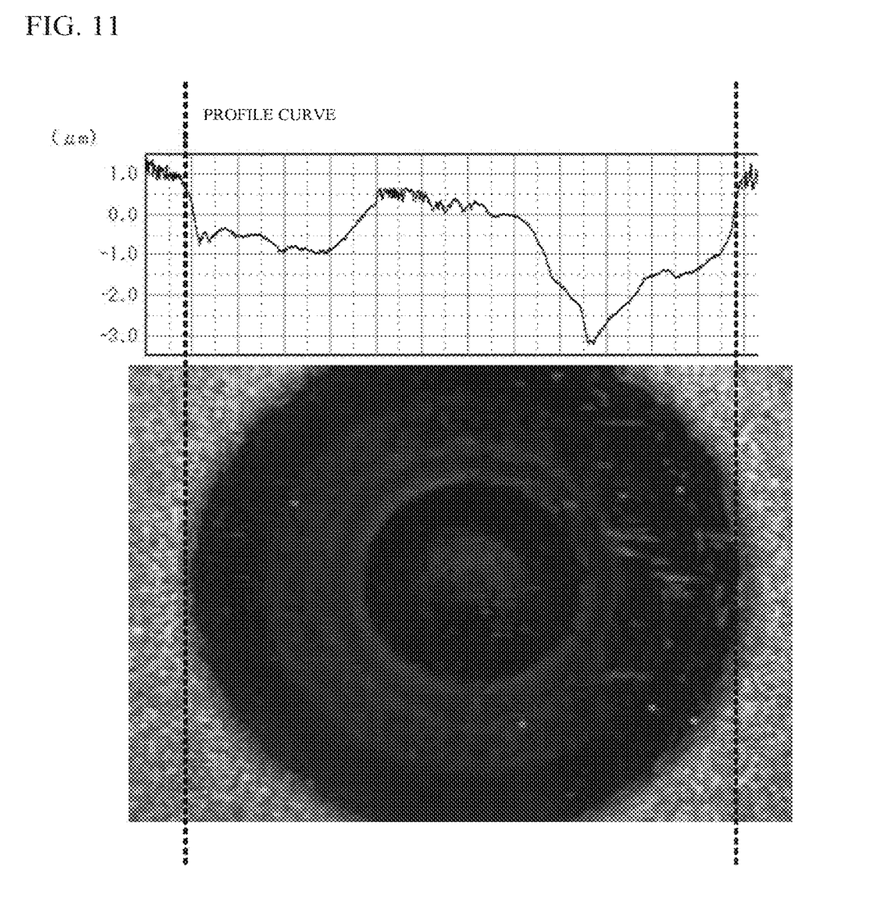
FIG. 11 is a height profile of the non-antiglare region of Example 4 and a top view thereof obtained through an examination with a microscope.

FIG. 8 to FIG. 11 are height profiles of the non-antiglare regions of Examples 1 to 4 and top views thereof obtained through an examination with a microscope. FIG. 8 corresponds to Example 1, FIG. 9 corresponds to Example 2, FIG. 10 corresponds to Example 3, and FIG. 11 corresponds to Example 4. It can be seen from FIG. 8 to FIG. 11 that in each of Examples 1 to 3, in which the item "Results" was ○, the non-antiglare region had a maximum height difference within the non-smooth surface of 0.6 µm or less. Furthermore, in Example 1, in which exceedingly satisfactory results were obtained, the non-antiglare region had a maximum height difference within the non-smooth surface of 0.4 µm or less. Incidentally, in Examples 4 to 14, in which the item "Results" was × (poor), the non-antiglare regions each had a maximum height difference within the non-smooth surface of larger than 0.6 µm, although not shown in the drawings.

While the present invention has been described in detail and with reference to specific embodiments thereof, it will be apparent to one skilled in the art that various changes and modifications can be made therein without departing from the spirit and scope thereof.

DESCRIPTION OF THE REFERENCE NUMERALS

1 Grindstone
2 Supporting part
3 Grindstone part
4 Lower end surface
5 Chamfer
6 Non-antiglare region

The invention claimed is:

1. A glass substrate comprising:
a glass plate;
an antiglare region formed on at least one of main surfaces of the glass plate; and
a non-antiglare region formed on the same main surface as the antiglare region,
wherein the non-antiglare region is a non-smooth surface formed by removing by at least grinding a part of the antiglare region on the main surface of the glass plate and has a maximum height difference within the non-smooth surface of 0.6 µm or less,
wherein the non-smooth surface is not a fire-ground surface formed during a glass plate formation, and
wherein the non-smooth surface has a trajectory of a grindstone.

2. The glass substrate according to claim 1, wherein the maximum height difference within the non-smooth surface is 0.4 µm or less.

3. The glass substrate according to claim 1, wherein the non-antiglare region is circular.

4. The glass substrate according to 2, wherein the non-antiglare region is circular.

5. The glass substrate according to claim 3, wherein the trajectory of the grindstone includes a plurality of trajectories in combination.

6. The glass substrate according to claim 3, wherein the trajectory of the grindstone includes such trajectories that a grindstone is moved in a radial direction so that a center of the grindstone passes through a center of the circle of the non-antiglare region.

7. The glass substrate according to claim 3, wherein the trajectory of the grindstone includes such trajectories that a grindstone is moved along a shape of N so that a center of the shape of N comes to coincide with a center of the circle.

* * * * *